United States Patent
Maeda et al.

(10) Patent No.: US 8,323,074 B2
(45) Date of Patent: Dec. 4, 2012

(54) BRAKE DISK BRAKING SURFACE PROCESSING DEVICE

(75) Inventors: Takao Maeda, Iwata (JP); Taku Nishiki, Iwata (JP)

(73) Assignee: NTN Corporation, Osaka (JP)

( * ) Notice: Subject to any disclaimer, the term of this patent is extended or adjusted under 35 U.S.C. 154(b) by 903 days.

(21) Appl. No.: 11/989,774

(22) PCT Filed: Apr. 7, 2006

(86) PCT No.: PCT/JP2006/307482
§ 371 (c)(1),
(2), (4) Date: Jan. 26, 2009

(87) PCT Pub. No.: WO2007/015322
PCT Pub. Date: Feb. 8, 2007

(65) Prior Publication Data
US 2009/0275270 A1 Nov. 5, 2009

(30) Foreign Application Priority Data
Aug. 3, 2005 (JP) ................................. 2005-225746

(51) Int. Cl.
*B24B 7/00* (2006.01)
*B24B 29/04* (2006.01)

(52) U.S. Cl. ............. 451/66; 82/112; 451/262; 451/269

(58) Field of Classification Search .................... 82/112; 451/65, 66, 262, 268, 269
See application file for complete search history.

(56) References Cited

U.S. PATENT DOCUMENTS
2,122,978 A * 7/1938 Eldridge et al. .............. 451/210
(Continued)

FOREIGN PATENT DOCUMENTS
JP 59-047159 3/1984
(Continued)

OTHER PUBLICATIONS
Japanese Office Action issued Jul. 15, 2011 in corresponding Japanese Patent Application No. 2005-225746 w/partial English translation.
(Continued)

*Primary Examiner* — Timothy V Eley
(74) *Attorney, Agent, or Firm* — Wenderoth, Lind & Ponack, L.L.P.

(57) ABSTRACT

A brake disk braking surface processing device 1 includes a rotation driving device 11 that rotates a brake disk 2, a processing section 12 that processes braking surfaces 4 and 5 of the brake disk 2, and pressing rollers 13 and 14 that press the braking surfaces 4 and 5 of the brake disk 2. The brake disk braking surface processing device 1 includes the pressing rollers 13 and 14 that press the braking surfaces 4 and 5 of the brake disk 2. Therefore, even when tools are pressed against the braking surfaces 4 and 5 in a direction perpendicular to the braking surfaces 4 and 5, deformation of the braking surfaces 4 and 5 of the brake disk 2 can be suppressed with certainty. As a result, processing accuracy of the braking surfaces 4 and 5 of the brake disk 2 can be enhanced.

8 Claims, 5 Drawing Sheets

U.S. PATENT DOCUMENTS

| | | | | |
|---|---|---|---|---|
| 3,691,878 A | * | 9/1972 | Mitchell | 82/1.11 |
| 3,721,046 A | * | 3/1973 | Dunn | 451/14 |
| 4,266,454 A | * | 5/1981 | Mitchell et al. | 82/1.11 |
| 5,133,155 A | * | 7/1992 | Schwar | 451/269 |
| 5,152,104 A | * | 10/1992 | Wood et al. | 451/269 |
| 5,507,686 A | * | 4/1996 | Wolters | 451/63 |
| 5,737,159 A | * | 4/1998 | Nakamura et al. | 360/135 |

FOREIGN PATENT DOCUMENTS

| | | |
|---|---|---|
| JP | 09-225793 | 9/1997 |
| JP | 11-077489 | 3/1999 |
| JP | 11-077498 | 3/1999 |
| JP | 11-343021 | 12/1999 |
| JP | 2001-260014 | 9/2001 |
| JP | 2002-210639 | 7/2002 |

OTHER PUBLICATIONS

International Search Report mailed Jun. 13, 2006 for International Application No. PCT/JP2006/307482.

* cited by examiner

BRAKE DISK BRAKING SURFACE PROCESSING DEVICE

TECHNICAL FIELD

The present invention relates to a brake disk braking surface processing device.

BACKGROUND ART

Generally, in a braking device of an automobile, a brake pad is pressed against a braking surface on both sides of a brake disk rotor attached to a wheel using hydraulic pressure, thereby slowing or stopping a movement of the brake disk rotor (wheel). A driver operating a brake pedal performs this operation. Therefore, the braking surface is required to be processed (by grinding or cutting) such that the brake disk rotor does not shake from a shaft center when the brake pad is pressed against the braking surface of the brake disk rotor.

For example, as shown in FIG. 1, a brake disk braking surface processing device 1 rotates a hub unit 3 on which a brake disk 2 is mounted. Tools 6 are pressed against braking surfaces 4 and 5 of the brake disk 2. As a result, processing such as grinding and cutting are performed. A similar brake disk braking surface processing device is disclosed in Japanese Patent Laid-open Publication No. 2002-210639.
Patent Document 1: Japanese Patent Laid-open Publication No. 2002-210639

DISCLOSURE OF THE INVENTION

Problems to be Solved by the Invention

When the braking surfaces 4 and 5 of the disk brake 2 are processed, a pressing roller 8 presses against an outer peripheral side surface 7 of the brake disk 2, as shown in FIG. 1, to suppress shaking of the brake disk 2.

However, when the braking surfaces 4 and 5 are ground or cut by a tool pressing the braking surfaces in a direction perpendicular to the braking surfaces, a pressing force is applied to the braking surfaces 4 and 5 in the direction perpendicular to the braking surfaces. Therefore, even when the pressing roller 8 presses in a radial direction from the outer peripheral side surface 7, deformation of the braking surfaces 4 and 5 of the disk brake 2 may not be sufficiently suppressed.

When the outer peripheral side surface 7 of the brake disk 2 has a scratch, or when the outer peripheral side surface 7 of the brake disk 2 is painted and has a paint spot, the outer peripheral side surface 7 of the brake disk 2 may be uneven. In this case, in the method in which the pressing roller 8 presses against the outer peripheral side surface 7 of the brake disk 2, the pressing force from the pressing roller 8 changes because of the unevenness. Therefore, the brake disk 2 may chatter.

When a rotational center of the brake disk 2 and a center of the outer peripheral side surface 7 of the brake disk 2 are misaligned, or when the brake disk 2 is not mounted perpendicular to a rotation axis, the brake disk 2 swings vertically in adherence to rotation at a portion against which the pressing roller 8 is pressing. In this case, when the brake disk 2 swings vertically by a large amount, the pressing roller 8 does not come into even contact with the outer peripheral side surface 7 of the brake disk 2. The swinging of the brake disk 2 cannot be suppressed, and the brake disk 2 may chatter.

Means for Solving the Problems

A brake disk braking surface processing device of the invention includes a rotation driving device, a processing section, and a pressing roller. The rotation driving device rotates a brake disk. The processing section processes a braking surface of the brake disk. The pressing roller presses the braking surface of the brake disk.

The pressing roller can be provided before a processing position of the processing section and can press against a pre-processing position. The pressing roller can be supported such as to follow a vertical swinging of the brake disk that accompanies rotation. The pressing roller can also be a crowned roller.

Advantage of the Invention

The brake disk braking surface processing device includes the pressing roller that presses the braking surface of the brake disk. Therefore, deformation of the braking surface of the brake disk can be suppressed with certainty, even when a tool presses against the braking surface in a direction perpendicular to the braking surface. As a result, processing accuracy of the braking surface of the brake disk can be enhanced.

When the pressing roller is provided before the processing position of the processing section and presses against the pre-processing position, the processing section processes a portion against which by the pressing roller has pressed. Therefore, even when the pressing roller scratches the braking surface, the processing section can remove the scratch.

When the pressing roller is supported such as to follow the vertical swinging of the braking surface of the brake disk that accompanies rotation, the pressing roller can press the brake disk even when the brake disk swings vertically in accompaniment to the rotation. Therefore, shaking of the brake disk can be prevented with certainty. When the pressing roller is the crowned roller, concentration of stress applied to the braking surface of the brake disk by the pressing roller can be reduced. Therefore, the braking surface of the brake disk can be prevented from becoming scratched.

BEST MODE FOR CARRYING OUT THE INVENTION

An embodiment of a brake disk braking surface processing device according to the present invention will be hereinafter described in detail, with reference to the drawings. Components and sections within the drawings performing the same operations are given same reference numbers.

Figure 1:
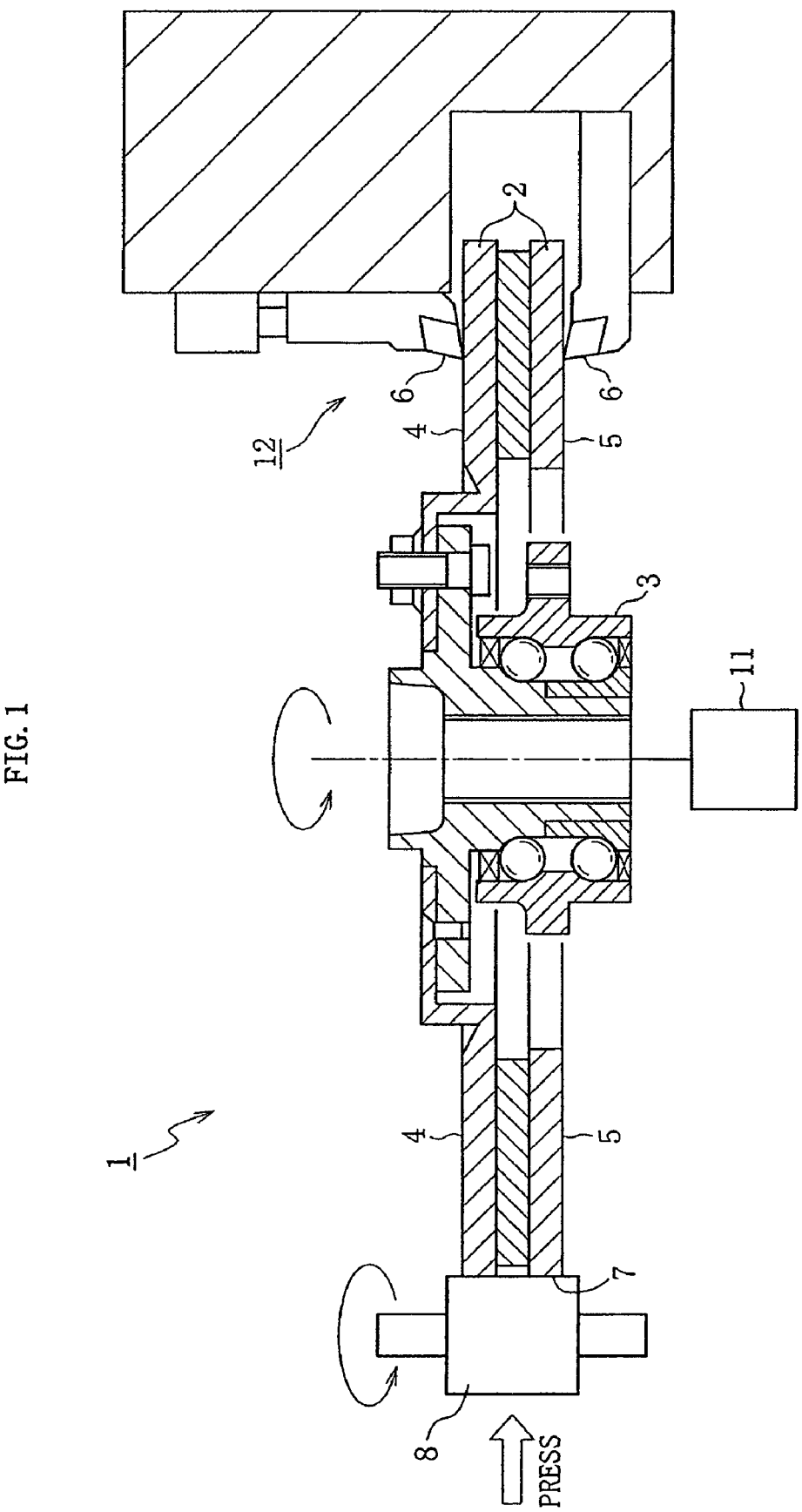
FIG. 1 is a diagram of a brake disk braking surface processing device.
Figure 2:
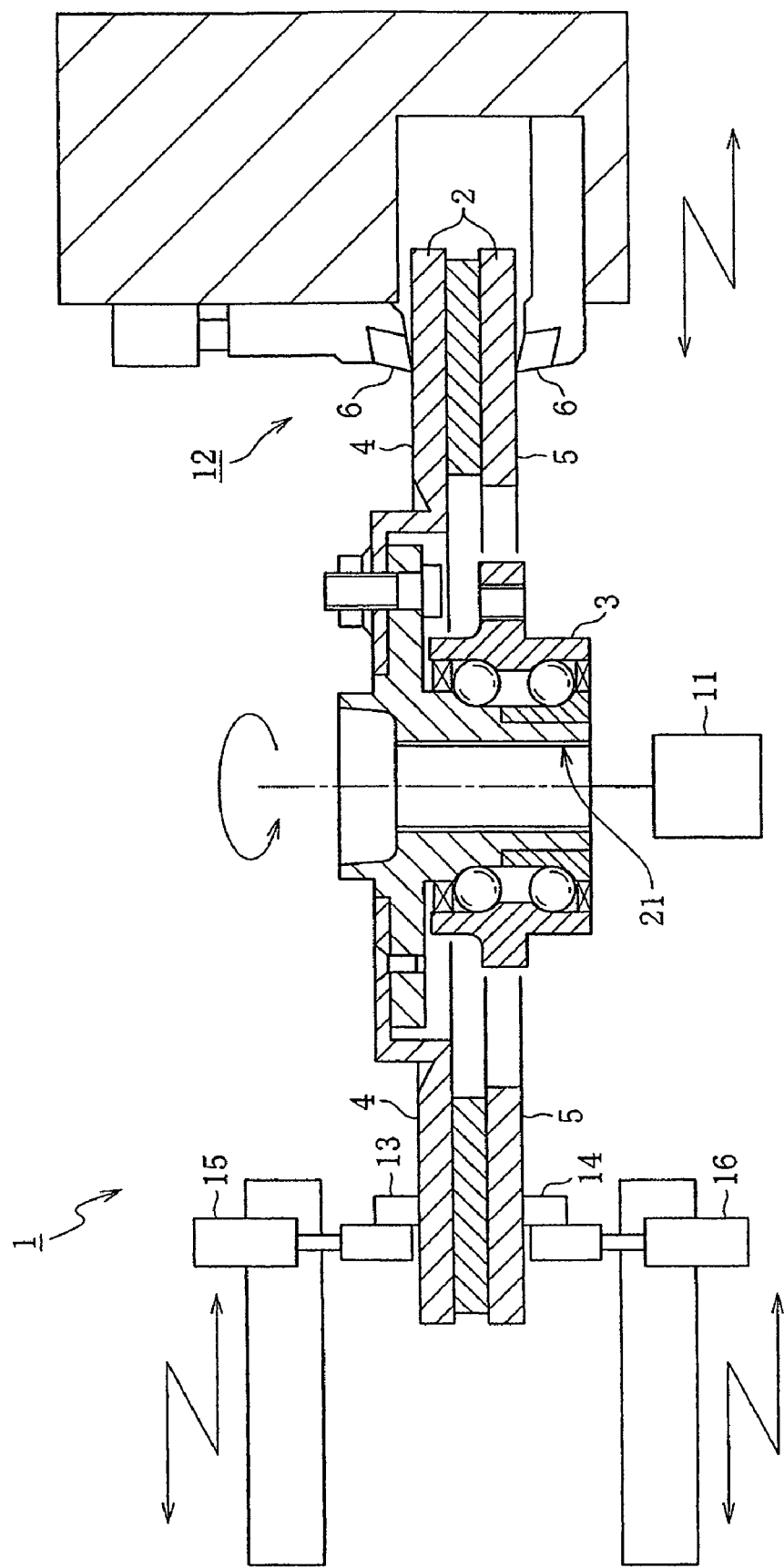
FIG. 2 is a vertical cross-sectional view of a brake disk braking surface processing device according to an embodiment of the present invention.

As shown in FIG. 2, a brake disk braking surface processing device 1 includes a rotation driving device 11, a processing section 12, and pressing rollers 13 and 14.

Figure 3:
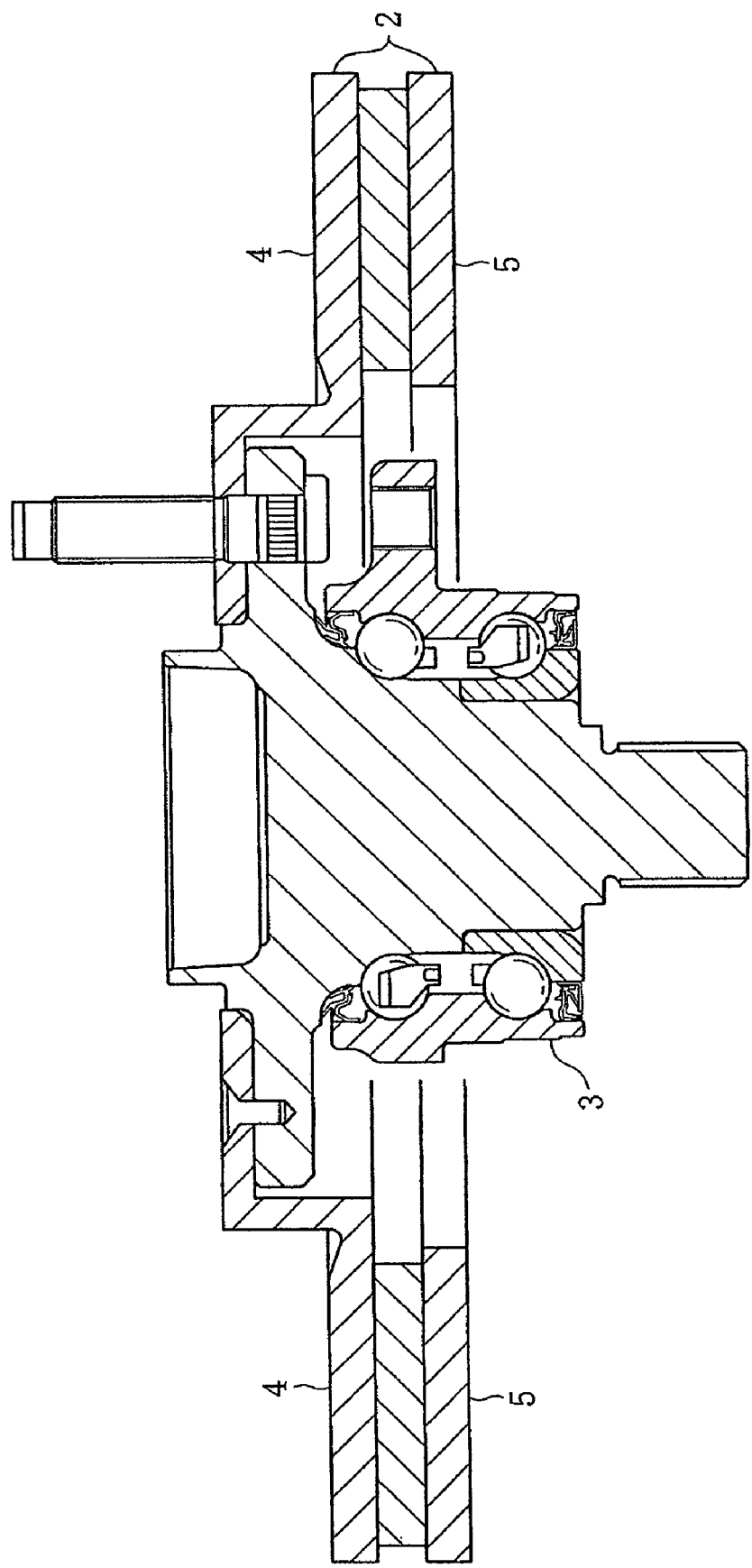
FIG. 3 is a vertical cross-sectional view of another configuration of a hub unit.
Figure 4:
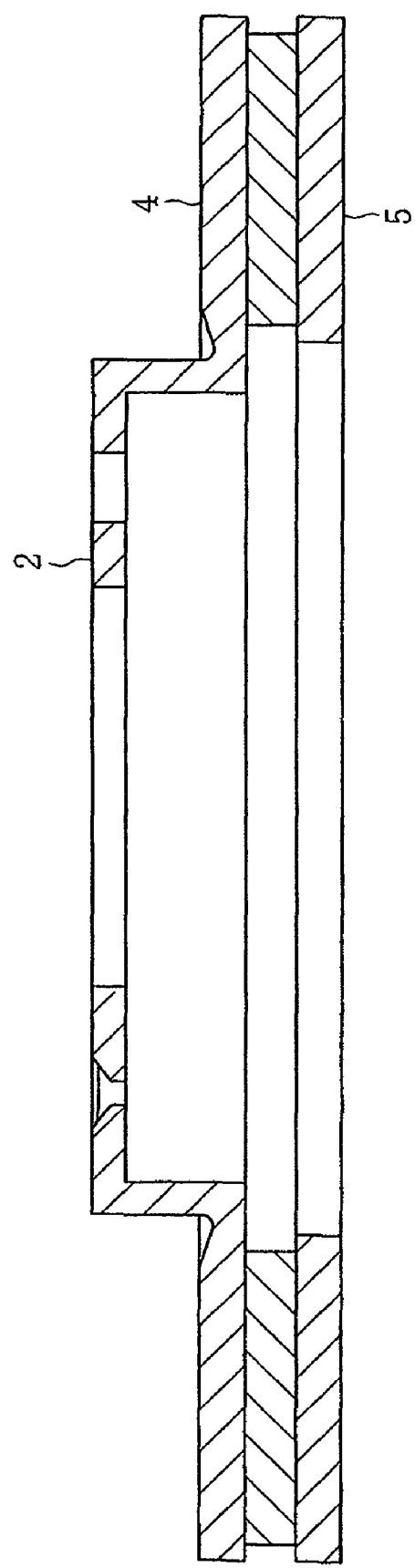
FIG. 4 is a vertical cross-sectional view of a brake disk unit.

The rotation driving device 11 rotates the brake disk 2. According to the embodiment, as shown in FIG. 2, the rotation driving device 11 supports a hub unit 3 on which the brake disk 2 is mounted. A spline hole 21 is formed in the hub unit 3, shown in FIG. 2, in a center axial direction. A rotation driving axis (not shown) of the rotation driving device 11 is connected to the spline hole 21 of the hub unit 3. The rotation driving device 11 rotates the hub unit 3. As shown in FIG. 3, some hub units 3 do not have the spline hole 21. In this case, in correspondence with the hub unit 3 that has no spline hole 21, the rotation driving device 11 can support a rotation axis of the hub unit 3 and rotate the hub unit 3. The rotation driving device 11 can include a mounting section for setting a brake disk 2 unit and rotate the brake disk 2 as a single unit, as shown in FIG. 4.

The processing section 12 processes the braking surfaces 4 and 5 of the brake disk 2. According to the embodiment, tools 6 are mounted on the processing section 12 such as to sandwich the upper and lower braking surfaces 4 and 5 of the brake disk 2. The processing section 12 can simultaneously process the upper and lower braking surfaces 4 and 5. The processing section 12 simultaneously processes the upper and lower braking surfaces 4 and 5 in a circumferential direction in accompaniment to the rotation of the brake disk 2 by the rotation driving device 11. The processing section 12 gradually moves in a radial direction and processes the entire surfaces of the braking surfaces 4 and 5. According to the embodiment, the processing unit 12 performs processing, gradually moving from an outer diameter side to an inner diameter side of the brake disk 2. A cutting tool or a grinding tool, for example, can be used as the tools mounted on the processing section 12.

The pressing rollers 13 and 14 press the braking surfaces 4 and 5 of the brake disk 2. According to the embodiment, the pressing rollers 13 and 14 face each other, forming a pair above and below the brake disk 2 such as to sandwich the upper and lower braking surfaces 4 and 5 of the brake disk 2. The pressing rollers 13 and 14 are roller components. The pressing rollers 13 and 14 rotate such as to follow the rotation of the brake disk 2, while sandwiching the brake disk 2 from above and below.

According to the embodiment, the pressing rollers 13 and 14 are provided in positions misaligned with the processing section 12 in the circumferential direction. As is the processing section 12, the pressing rollers 13 and 14 gradually move in the radial direction, from the outer diameter side to the inner diameter side, in adherence to the rotation of the brake disk 2. The pressing rollers 13 and 14 always press the braking surfaces 4 and 5 of the brake disk 2 at a pre-processing position. In this case, should the pressing rollers 13 and 14 scratch the braking surfaces 4 and 5 of the brake disk 2, the scratched portion is processed by the processing section 12. Therefore, the scratch on the braking surfaces 4 and 5 can be removed.

The brake disk 2 may swing vertically in accompaniment to the rotation. The pressing rollers 13 and 14 can be supported such as to swing vertically in adherence to the swinging of the brake disk 2. Supporting sections 15 and 16 of the pressing rollers 13 and 14 support the pressing rollers 13 and 14 via an elastic supporting component, such as a cylinder or a spring, thereby allowing the pressing rollers 13 and 14 to swing elastically in the vertical direction. Therefore, even when the brake disk 2 swings vertically, the pressing rollers 13 and 14 swing in adherence to the swinging. Therefore, the braking surfaces 4 and 5 of the brake disk 2 can be prevented from becoming scratched.

The brake disk braking surface processing device 1 includes the pressing rollers 13 and 14 that press the braking surfaces 4 and 5 of the brake disk 2. Therefore, deformation of the braking surfaces 4 and 5 of the brake disk 2 can be suppressed with certainty in correspondence with the processing section that presses the tools in the direction perpendicular to the braking surfaces 4 and 5. As a result, processing accuracy of the braking surfaces 4 and 5 of the brake disk 2 can be significantly enhanced.

According to the embodiment, the pressing rollers 13 and 14 are provided before the processing position of the processing section 12 and press against the pre-processing position. Therefore, even when the pressing rollers 13 and 14 scratch the braking surfaces 4 and 5 of the brake disk 2, the scratch can be removed when the processing section 12 processes the braking surfaces 4 and 5 of the brake disk 2.

According to the embodiment, even when the braking surfaces 4 and 5 of the brake disk 2 swing vertically in accompaniment to the rotation, the pressing rollers 13 and 14 are supported such as to follow the swinging of the braking surfaces 4 and 5. Therefore, even when the brake disk 2 swings vertically in accompaniment to the rotation, the pressing rollers 13 and 14 follow the swinging, thereby preventing the brake disk 2 from shaking with certainty.

The brake disk braking surface processing device according to an embodiment of the invention is described with reference to the drawings. However, the brake disk braking surface processing device of the invention is not limited to the above-described embodiment.

Figure 5:
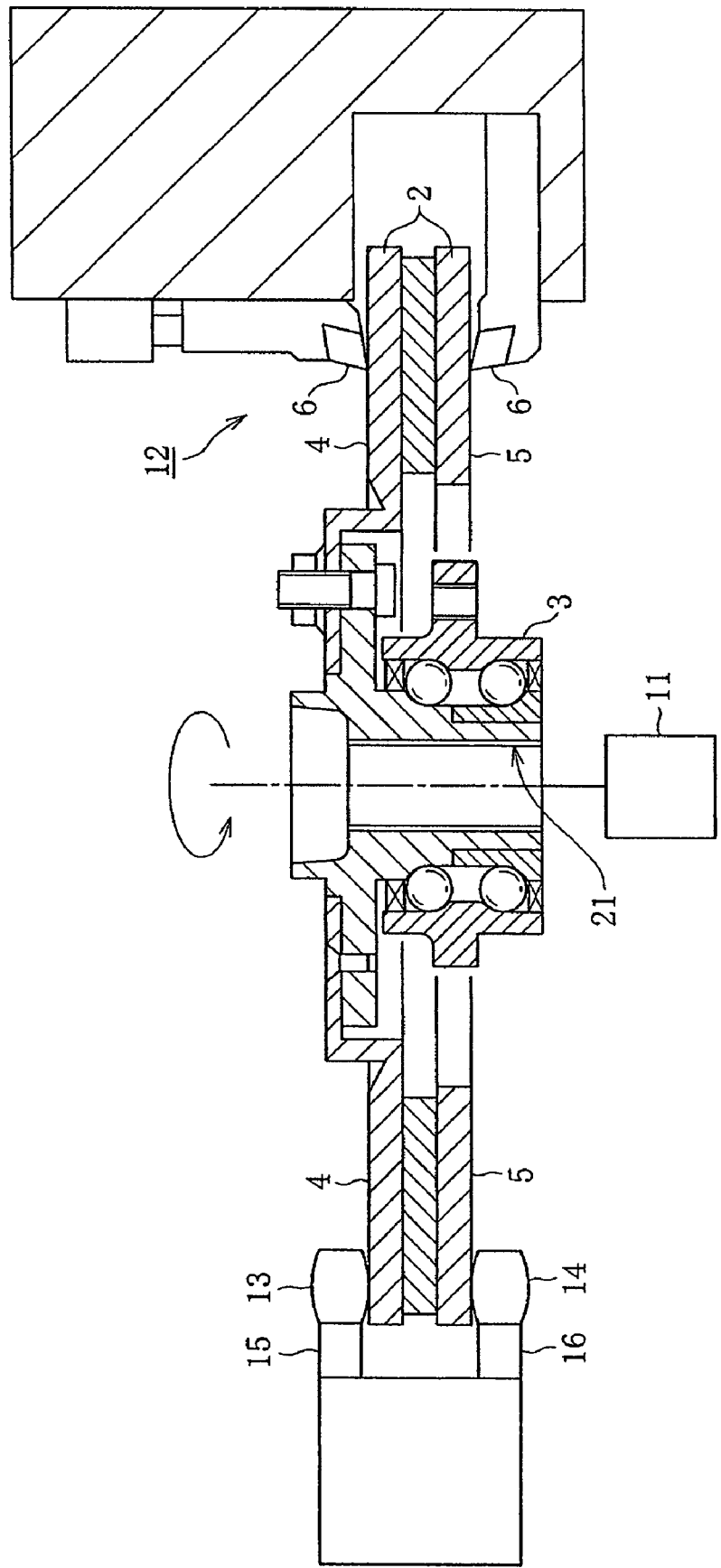
FIG. 5 is another embodiment of a pressing roller.

For example, as shown in FIG. 5, the pressing rollers 13 and 14 can be crowned rollers. In this case, concentration of stress applied to the braking surfaces 4 and 5 of the brake disk 2 from the pressing rollers 13 and 14 can be reduced. The braking surfaces 4 and 5 of the brake disk 2 can be prevented from becoming scratched.

The invention claimed is:

1. A brake disk braking surface processing device comprising:
    a rotation driving device that rotates a brake disk;
    a processing section that processes a braking surface of the brake disk; and
    a pressing roller that presses the braking surface of the brake disk,
    wherein the rotation of the brake disk causes the pressing roller to rotate.

2. The brake disk braking surface processing device according to claim 1, wherein the pressing roller is provided before a processing position of the processing section and presses against a pre-processing position.

3. The brake disk braking surface processing device according to claim 1, wherein, even when the brake disk swings in accompaniment to the rotation, the pressing roller is supported such as to follow the swinging of the brake disk.

4. The brake disk braking surface processing device according to claim 1, wherein the pressing roller is composed of a crowned roller.

5. A brake disk braking surface processing device comprising:
    a rotation driving device that rotates a brake disk about an axis of rotation;
    a processing section that processes a braking surface of the brake disk, the braking surface of the brake disk being orthogonal to the axis of rotation and orthogonal to an annular circumferential surface of the brake disk; and
    a pressing roller that presses the braking surface of the brake disk,
    wherein the rotation of the brake disk causes the pressing roller to rotate.

6. The brake disk braking surface processing device according to claim 5, wherein the pressing roller is provided before a processing position of the processing section and presses against a pre-processing position.

7. The brake disk braking surface processing device according to claim 5, wherein, even when the brake disk swings in accompaniment to the rotation, the pressing roller is supported such as to follow the swinging of the brake disk.

8. The brake disk braking surface processing device according to claim 5, wherein the pressing roller is composed of a crowned roller.

* * * * *